(12) United States Patent
Jacoby

(10) Patent No.: US 7,407,699 B2
(45) Date of Patent: Aug. 5, 2008

(54) EXTRUDED POLYPROPYLENE SHEETS CONTAINING BETA SPHERULITES

(75) Inventor: Philip Jacoby, Marietta, GA (US)

(73) Assignee: Mayzo, Inc., Norcross, GA (US)

( * ) Notice: Subject to any disclaimer, the term of this patent is extended or adjusted under 35 U.S.C. 154(b) by 132 days.

(21) Appl. No.: 10/824,730

(22) Filed: Apr. 15, 2004

(65) Prior Publication Data

US 2005/0003151 A1    Jan. 6, 2005

Related U.S. Application Data

(60) Provisional application No. 60/463,751, filed on Apr. 16, 2003.

(51) Int. Cl.
*B29D 28/00* (2006.01)

(52) U.S. Cl. .................. 428/136; 428/131; 428/910

(58) Field of Classification Search ......... 428/131–136, 428/910
See application file for complete search history.

(56) References Cited

U.S. PATENT DOCUMENTS

| | | | | |
|---|---|---|---|---|
| 3,555,604 A | 1/1971 | Pahike | | 18/14 |
| 3,957,448 A | 5/1976 | Shepard et al. | | 23/288 |
| 4,185,148 A | 1/1980 | Sato et al. | | 526/348.1 |
| 4,326,489 A | 4/1982 | Heitert | | 123/520 |
| 4,374,798 A | 2/1983 | Mercer | | 264/288.8 |
| 4,386,129 A | 5/1983 | Jacoby | | 428/215 |
| 4,535,125 A | 8/1985 | McCullough, Jr. | | 525/88 |
| 4,975,469 A * | 12/1990 | Jacoby et al. | | 521/84.1 |
| 5,075,136 A | 12/1991 | Nield et al. | | 427/175 |
| 5,169,712 A | 12/1992 | Tapp | | 428/315.5 |
| 5,231,126 A | 7/1993 | Shi et al. | | |
| 5,232,992 A | 8/1993 | Asanuma et al. | | 525/240 |
| 5,277,520 A | 1/1994 | Travis | | 405/129.6 |
| 5,278,216 A | 1/1994 | Asanuma et al. | | 524/394 |
| 5,298,537 A | 3/1994 | Vaidva | | 523/205 |
| 5,310,584 A | 5/1994 | Jacoby et al. | | |
| 5,548,007 A | 8/1996 | Asanuma et al. | | 524/99 |
| 5,594,070 A | 1/1997 | Jacoby et al. | | 525/88 |

(Continued)

FOREIGN PATENT DOCUMENTS

DE         3610644        10/1986

(Continued)

OTHER PUBLICATIONS

Jones et al., "Crystalline Forms of Isotactic Polypropylene," *Makromol Chem.*, 75, 134-158 (1964).

(Continued)

*Primary Examiner*—Alicia Chevalier
(74) *Attorney, Agent, or Firm*—Needle & Rosenberg, P.C.

(57) ABSTRACT

Improved extruded polypropylene sheets containing a high level of beta crystallinity and A process for making such sheets are disclosed herein. The polypropylene sheets comprise a resinous polymer of propylene and an effective amount of beta spherulites. Uniaxially or biaxially oriented mesh structures produced from the disclosed sheets exhibit lower density, higher strength, and higher torsional rigidity than polypropylene meshes without beta spherulites. Thus, lighter weight mesh structures which meet all of the physical property requirements for end-use applications, such as reinforcing grids to stabilize concrete and soil in civil engineering and landfill applications, are produced. The lighter weight extruded beta-nucleated sheet can also be stretched at higher line speeds, thereby reducing manufacturing costs.

18 Claims, 7 Drawing Sheets

U.S. PATENT DOCUMENTS

| | | | |
|---|---|---|---|
| 5,753,337 A | 5/1998 | Slocumb | |
| 5,883,188 A | 3/1999 | Hwang et al. | 525/71 |
| 6,020,275 A | 2/2000 | Stevenson et al. | 442/60 |
| 6,077,904 A | 6/2000 | Dalgewicz, III et al. | 525/64 |
| 6,107,404 A | 8/2000 | Ryntz | 525/191 |
| 6,207,093 B1 | 3/2001 | Hanyu et al. | 264/210.6 |
| 6,284,833 B1 | 9/2001 | Ford et al. | 524/515 |
| 6,391,461 B1 | 5/2002 | Ryntz et al. | 428/424.8 |
| 6,576,709 B2 | 6/2003 | Kim | 525/191 |
| 6,596,814 B2 | 7/2003 | Kim et al. | 525/191 |
| 6,667,367 B1 | 12/2003 | Berta | 525/63 |
| 6,716,926 B1 | 4/2004 | Børve | 525/242 |
| 6,733,719 B2 | 5/2004 | DiNardo et al. | 264/564 |
| 6,733,898 B2 | 5/2004 | Kim et al. | 428/500 |
| 2004/0158002 A1 | 8/2004 | McGoldrick et al. | 525/245 |
| 2004/0170790 A1 | 9/2004 | Ek et al. | 428/36.91 |
| 2005/0003151 A1 | 1/2005 | Jacoby | 428/131 |
| 2005/0043447 A1 | 2/2005 | Jacoby | 428/131 |

FOREIGN PATENT DOCUMENTS

| | | |
|---|---|---|
| EP | 0 492 942 A2 | 7/1992 |
| EP | 1 369 221 A1 | 12/2003 |
| WO | WO 02/066233 A | 8/2002 |
| WO | WO 2004/094259 | 11/2004 |

OTHER PUBLICATIONS

Ryntz, "The effects of thermoplastic poly(olefin) (TPO) morphology on subsequent paintability and thermal shock performance," *Organic Coatings*, (1996) pp. 241-254.

Sharples A., *Introduction to Polymer Crystallization*, St. Martens Press, 1966, pp. 12-16.

*The Polypropylene Handbook*, Hanser Publications, NY (1996), pp. 297-298.

Dragaun et al. "Shear-induced β-form crystallization in isotactic polypropylene" *Journal of Polymer Science: Polymer Physics Edition*, 15(10): 1779-1789 (1977).

Duswalt, et al., "A thermal study of β-form polypropylene," *Amer. Chem. Soc. Div. Org. Coat.*, 30(2): 93-96 (1970).

Leugering, "Einfluβ der kristallstruktur und der überstruktur auf einige eigenschaften von polypropylene," *Makromol. Chem.* 109(2482): 204-216 (1967). (English summary only).

Leugering, et al., "Beeinflussung der kristallstruktur von isotaktischem polypropylen durch kristallization aus orientierten schmelzen," *Die Angew. Makro. Chem.* 33(476): 17-23 (1973). (English summary only).

Lovinger et al. "Studies on the α and β forms of isotactic polypropylene by crystallization in a temperature gradient" *Journal of Polymer Science: Polymer Physics Edition*, 15(4): 641-656.

* cited by examiner

EXTRUDED POLYPROPYLENE SHEETS CONTAINING BETA SPHERULITES

CROSS-REFERENCE TO RELATED APPLICATIONS

This application claims benefit of U.S. Provisional Application No. 60/463,751, entitled "Extruded Polypropylene Sheets Containing Beta Spherulites", filed Apr. 16, 2003, by Philip Jacoby,

FIELD OF THE INVENTION

The present invention relates to extruded polypropylene sheets with improved properties and methods for making such polypropylene sheets. In particular, a beta nucleating agent is added to the polymer to form beta spherulites in the sheet.

BACKGROUND OF THE INVENTION

Plastic net structures are used as reinforcing grids to stabilize concrete and soil in civil engineering and landfill applications. These plastic net structures generally are either uniaxially or biaxially stretched to provide a highly stable, corrosion resistant construction used for such applications as soil stabilization, veneer stabilization, drainage nets in landfills, and concrete stabilization in roads, bridges, and similar structures. Biaxially oriented polypropylene nets have been used to reinforce road beds. Typically plastic net structures are formed of a polypropylene homopolymer or a copolymer of propylene with ethylene or butene.

In applications where the reduction or elimination of creep is important, such as in the stabilization of roads and soil, the reinforcing material should have minimal creep, so that it does not stretch excessively under load. Polyolefin plastic nets are particularly suitable for these applications since they are not subject to hydrolysis. In order to have minimal creep, the plastic web should have a high modulus and be of sufficient thickness so that it deforms to a minimal extent (i.e. exhibits low creep) when a loads are applied to it. Although, presently available plastic reinforcing net structures have proven generally satisfactory for their intended purpose, improved processes and reduced cost structures are desirable.

In the prior art used to produce a biaxially oriented polypropylene netting, the material located at the periphery of the junctions of the machine-direction and cross-machine-direction strands, herein referred to as "nodes", mainly contains a random molecular orientation. These node regions therefore have undesirably low strength. Moreover the central regions of these nodes tend to be in the form of thick, unoriented humps. These humps constitute areas of weakness, and areas in which the material is inefficiently used. However, the junctions of the machine-direction and cross-machine-direction strands must be strong since these junctions bear a considerable amount of the load when the netting is used for its intended function.

Crystalline polypropylene (also known as "isotactic polypropylene") is capable of crystallizing in three polymorphic forms: the alpha, beta and gamma forms. In melt-crystallized material the predominant polymorph is the alpha or monoclinic form. The beta or pseudohexagonal form generally occurs at levels of only a few percent, unless certain heterogeneous nuclei are present or the crystallization has occurred in a temperature gradient or in the presence of shearing forces. The gamma or triclinic form is typically only observed in low-molecular weight or stereoblock fractions that have been crystallized at elevated pressures.

The alpha form also is also referred to as "alpha-spherulites" and "alpha-crystals". The beta form is also referred to as "beta-spherulites", "beta-crystals", "beta-form spherulites", or "beta-crystallinity". Beta-crystals have a melting point that is generally 10-15° C. lower than that of alpha-crystals.

Generally, extruded polypropylene sheets primarily contain alpha spherulites. Beta nucleants can be added to a polypropylene resin to increase the amount of beta spherulites in the resulting polypropylene sheet.

Porous polypropylene films containing beta spherulites have been used as microporous films. (see U.S. Pat. No. 4,975,469 to P. Jacoby and C. Bauer) The presence of beta nucleants results in the formation of beta spherulites in the sheet, which produce a microporous structure in the resulting stretched film. The micropores allow gases to permeate through the film.

Similarly, beta nucleants have been added to thermoformable thermoplastic resin polypropylene in order to broaden the temperature range over which the sheets can be processed and to prevent sag in the thermoforming oven. (see U.S. Pat. No. 5,310,584 to Jacoby et al.) The beta nucleants induce microvoiding in the sheet when it is deformed during the thermoforming process. Sheets containing high levels of beta spherulites can be thermoformed at lower temperatures than polypropylene sheets formed from alpha nucleated polypropylene or non-nucleated polypropylene since the beta spherulites melt at a lower temperature than the alpha spherulites. This allows the sheets to soften without excessive sag in the thermoforming oven.

Poly propylene net structures must be strong and flexible. They are formed by a process that involves stretching in one or two directions. Thus, sagging in an oven is not a problem in the formation of oriented net structures. Also, if beta spherulites were added, induced microvoiding could lead to an undesirable strength reduction in the oriented strands that comprise the net.

Therefore it is an object of the invention to provide a biaxially oriented polypropylene net that has improved properties and costs less than standard polypropylene nets.

It is a further object to provide a more efficient and less expensive process for making polypropylene nets.

BRIEF SUMMARY OF THE INVENTION

An improved extruded polypropylene sheet that contains a high level of beta crystallinity and a process for making such sheets are disclosed herein. The polypropylene sheet contains at least one layer of a resinous polymer of propylene and an effective amount of beta spherulites. The beta spherulites in the sheet are produced by the incorporation of a beta nucleating agent in the polymer. The presence of the beta spherulites in the sheet facilitates the process of post-stretching the perforated sheet to produce a uniaxially or biaxially oriented mesh structure, and also broadens the temperature range over which this stretching can be performed. During the stretching process, the beta spherulites undergo microvoiding, causing the final mesh to have a lower density than a polypropylene mesh without beta spherulites. The perforated beta nucleated sheet also exhibits different stretching characteristics during the orientation steps than sheets without beta spherulites, such that more resinous polymer is drawn out of the node junction region between the machine direction (MD) and transverse direction (TD) oriented strands. Thus a greater percentage of the web area has solid polymer structure. This altered stretching behavior results in an oriented web that has higher strength and torsional rigidity characteristics. The high strength and modulus of the strands that form the mesh, their reduced density, and the greater percentage of solid polymer in the web allows for the production of lighter weight mesh structures which meet all of the physical property requirements for end-use applications, such as reinforcing grids to stabilize concrete and soil in civil engineering and landfill applications. The lighter weight extruded beta nucleated sheet can also be stretched at higher line speeds, and this higher productivity also reduces the cost of the final product. Thus, a mesh that contains the same strength and modulus as a polypropylene mesh without beta spherulites can be formed from less raw material and at a faster rate when beta spherulites are used.

DETAILED DESCRIPTION OF THE INVENTION

I. Compositions

A. Polymer

Figure 1:
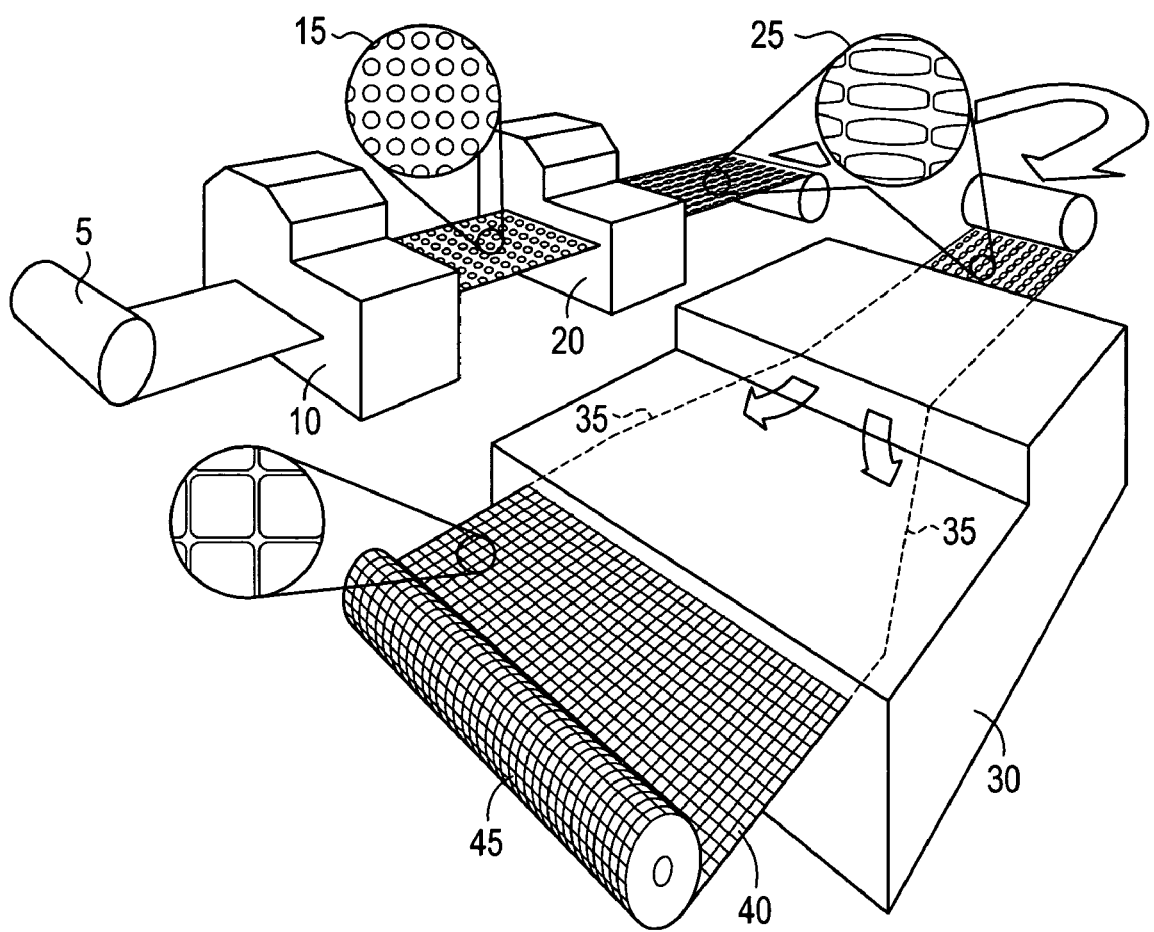
FIG. 1 is a schematic diagram showing the formation of a polymer net.

Various types of polyolefin resins can be used as the starting base resin. In the preferred embodiment, the polyolefin resin is a resinous polymer containing propylene. The polymer may be a homopolymer of polypropylene, a random or block copolymer of propylene and another α-olefin or a mixture of α-olefins, or a blend of a polympropylene homopolymer and a different polyolefin. For the copolymers and blends, the α-olefin may be polyethylene or an α-olefin having 4 to 12 carbon atoms. Preferably the α-olefin contains containing 4 to 8 carbon atoms, such as butene-1 or hexene-1. At least 50 mol % of the copolymer is formed from propylene monomers. The copolymer may contain up to 50 mol %, and preferably contains up to 40 mol %, of ethylene or an α-olefin having 4 to 12 carbon atoms, or mixtures thereof. Blends of propylene homopolymers with other polyolefins, such as high density polyethylene, low density polyethylene, or linear low density polyethylene and polybutylene can be used.

The resinous polymer of propylene (also referred to herein as "polypropylene-based resin" or "propylene polymer") should have a melt flow rate (MFR) as measured by ASTM-1238. This MFR is great enough for facile and economical production of the extruded sheet, but not so great as to produce a sheet with undesirable physical properties. Typically, the MFR should be in the range of about 0.1 to 10 decigrams/minute (dg/min), and preferably the MFR is from about 0.25 to 2.5 dg/min. When the MFR of the resin exceeds 10 dg/min, disadvantages are caused by the inability to orient the sheet to the desired draw ratios. When the MFR is less than 0.1 dg/min, difficulties are encountered in shaping of the sheet due to the high melt viscosity.

B. Beta Nucleating Agents

In the preferred embodiment, the beta spherulites are formed through the addition of a beta nucleating agent. H. J. Leugering, *Makromol. Chem.* 109, 204 (1967) and A. Duswalt et al., *Amer. Chem. Soc. Div. Org. Coat.*, 30, No. 293 (1970) disclose the use of certain nucleating agents to cause the preferential formation of beta-form spherulites. The structure of the nucleant induces the formation of crystals with a defined structure.

Alternative procedures known for preferentially inducing the formation of the beta-form spherulites do not form controlled amounts of beta-spherulites. These methods include crystallizing from a melt undergoing shear deformation (see e.g. Leugering et al., *Die Angew. Makro. Chem.* 33, 17 (1973) and H. Dragaun et al., *J Polym. Sci.*, 15, 1779 (1977)) and zone-crystallization in a temperature gradient (see e.g. Lovinger et al., *J Polym. Sci.*, 15, 641 (1977)).

In contrast, nucleating agents form beta-spherulites in a more controlled concentration these nucleation methods. The nucleating agent may be any inorganic or organic nucleating agent which can produce beta-spherulites in the melt-formed sheet at a concentration corresponding to a K-value obtained by x-ray diffraction analysis of 0.2 to 0.95. Alternatively, the efficiency of the beta nucleating agent and the concentration of beta spherulites in a polypropylene sample can be measured by the size of the melting endotherm observed in a differential scanning calorimeter (DSC) corresponding to the melting of the beta crystals.

Only a few materials are known to preferentially nucleate beta-form spherulites. Mixtures of the various beta-spherulite nucleating agents may be used. Suitable beta-nucleators include:

(a) the gamma-crystalline form of a quinacridone colorant Permanent Red E3B, herein referred to as "Q-dye". The structural formula for Q-dye is:

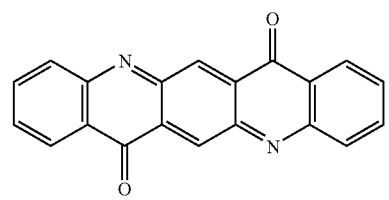

(b) the bisodium salt of o-phthalic acid;
(c) the aluminum salt of 6-quinizarin sulfonic acid;
(d) isophthalic and terephthalic acids; and
(e) N',N'-dicyclohexyl-2,6-naphthalene dicarboxamide, also known as NJ Star NU-100, developed by the New Japan Chemical Co.

Another suitable beta-nucleating agent is disclosed in German Patent DE 3,610,644. This beta-nucleating agent is prepared from two components, (A) an organic dibasic acid, such as pimelic acid, azelaic acid, o-phthalic acid, terephthalic acid, and isophthalic acid; and (B) an oxide, hydroxide or an acid salt of a metal of Group II, such as magnesium, calcium, strontium, and barium. The acid salt of the second component (B) may be derived from an organic or inorganic acid, such as a carbonate or stearate. The composition may contain up to 5 wt % of Components A and B (based the weight of the polymer) and preferably contains up to 1 wt % of Components A and B.

The properties of the resulting extruded sheet are dependent on the selection of the beta nucleant and the concentration of the beta nucleant. Sutiable concentration ranges for the beta nucleant depend on which beta nucleant is selected. The amount of nucleant depends on the effectiveness of the particular nucleant in inducing beta-crystals, and the thermal conditions under which the sheet is produced. The Q-dye is most effective at very low levels, in the range of 0.1 to 100 ppm. In the preferred embodiment, the beta nucleant is quinacridone colorant Permanent Red E3B and is present in the composition at a level of about 0.5 to about 50 ppm, based on the weight of the resinous polymer of propylene. For other beta nucleants, concentrations in the range of 200 to about 5000 ppm may be needed in order to produce an extruded sheet that has a K value in the desired range.

The nucleating agents are typically in the form of powdered solids. To efficiently produce beta-crystallites, the powder particles should be less than 5 microns in diameter and preferably no greater than 1 micron in diameter.

A commercially available beta nucleated polypropylene resin, such as B-022-SP or BI-4020-SP produced the SUNOCO® Chemical Company, can be used as the starting material to form the plastic net structure. The beta-nucleant used in this resin is the same as the one disclosed in German Patent DE 3,610,644.

C. Additives

The resinous polymer of propylene can be admixed as needed with a variety of additives, including lubricants, antioxidants, ultraviolet absorbers, radiation resistance agents, antiblocking agents, antistatic agents, coloring agents, such as pigments and dyes, opacifiers, such as $TiO_2$ and carbon black. Standard quantities of the additives are included in the resin. Care should be taken to avoid incorporation of other nucleating agents or pigments that act as nucleating agents since these materials may prevent the proper nucleation of beta-spherulites. Alpha nucleating agents that should omitted from the formulation include sodium benzoate, lithium benzoate, NA-11 from Amfine, which is the sodium salt of 2,2'-methylene bis (4,6-di-tert-butylphenyl) phosphate, and sorbitol clarifiers, such as Millad 3988 from Milliken Chemicals (i.e. bis(3,4-dimethylbenzylidene) sorbitol). Radical scavengers, such as dihydroxy talcite, should also be avoided since they have some nucleating ability.

Mineral materials used as whiteners or opacifiers, such as barium sulfate ($BaSO_4$), titanium dioxide ($TiO_2$) and calcium carbonate ($CaCO_3$), may be added to the resin. The effective amount of such additives depends upon the particular application or end-use intended for the plastic net and can range from 0.005 to about 5 wt %, based on the weight of the polymer.

Preferably, for the black plastic netting that is typically used for civil engineering applications, carbon black is added to the beta-nucleated resinous polymer of propylene at a level of about 0.5 to about 5 wt %, based on the weight of the polymer. The beta-nucleating agent can be incorporated into the carbon black concentrate that is added to the resin during the extrusion process.

Preferred antistatic agents include alkali metal alkane sulfonates, polyether-modified (i.e. ethoxylated and/or propoxylated) polydiorganosiloxanes, and substantially linear and saturated aliphatic tertiary amines containing a $C_{10-20}$ aliphatic radical and substituted by two $C_{1-4}$ hydroxyalkyl groups, such as N,N-bis-(2-hydroxyethyl)-alkyl amines containing $C_{10-20}$, preferably $C_{12-18}$, alkyl groups.

Suitable antiblocking agents include inorganic additives, such as silicon dioxide, calcium carbonate, magnesium silicate, aluminum silicate, calcium phosphate; nonionic surfactants; anionic surfactants; and incompatible organic polymers, such as polyamides, polyesters, and polycarbonates. Examples of lubricants include higher aliphatic acid amides, higher aliphatic acid esters, waxes, and metal soaps.

II. Method for Making Polypropylene Net Containing a High Level of Beta Crystallinity The method of producing the final uniaxially or biaxially oriented plastic net structure is achieved via the following steps:

1. Melt forming a polymeric composition that contains a crystalline resinous polymer of propylene containing an effective amount of nucleating agent capable of producing beta spherulites in the solidified sheet.

2. Quenching the melt-formed sheet at a quench temperature sufficient to produce beta-spherulites in the sheet. The resulting sheet has a K-value of ranging from 0.1 to 0.95, preferably ranging from about 0.2 to 0.95. Alternatively the resulting sheet shows a prominent melting peak for the beta crystal phase when a sample of the sheet is placed in a DSC and heated at a rate of 10° C. per minute.

3. Extruding the quenched sheet.

4. Perforating the quenched sheet after extrusion so that it contains a square or rectangular pattern of holes or depressions.

5. Heating the perforated sheet to a temperature sufficient to orient it in the machine (extrusion) direction at draw ratios ranging from 2:1 to 10:1.

For biaxially oriented net products, the uniaxially drawn sheet is heated to a temperature sufficient to orient it in a direction that is perpendicular to the MD at draw ratios ranging from 2:1 to 10:1.

FIG. 1 illustrates steps 4 and 5 used in the process for manufacturing the plastic net.

A. Melt Forming a Polymeric Composition

The nucleant can be dispersed in the resinous polymer of propylene by any suitable procedure normally used in the polymer art to effect thorough mixing of a powder with a polymer resin. For example, the nucleant can be powder blended with resin in powder or pellet form or the nucleant can be slurried in an inert medium and used to impregnate or coat the resin in powder or pellet form. Alternatively, powder and pellets can be mixed at elevated temperatures by using, for example, a roll mill or multiple passes through an extruder. A preferred procedure for mixing is the blending of nucleant powder and base resin pellets or powder and melt compounding this blend in an extruder. Multiple passesthrough the extruder may be necessary to achieve the desired level of dispersion of the nucleant. Ordinarily, this type of procedure is used to form a masterbatch of pelletized resin containing sufficient nucleant so that when a masterbatch is let down in ratios of 10/1 to 200/1 (polymer to nucleant) and blended with the base resin, the desired level of nucleant is obtained in the final product.

For example, in one embodiment, a Q-dye masterbatch may be formed by first adding a sufficient amount of the quinacridone dye to the polypropylene resin to form a polypropylene resin containing 40% of the quinacridone dye. 3% of this concentrate is then extrusion compounded with an additional 97% of polypropylene to make a new concentrate that contains 1.2% of the quinacridone dye ("the 1.2% concentrate"). A third compounding step is then performed where 3% of the 1.2% concentrate is blended with 97% of polypropylene to make a new concentrate that contained 0.036% of the quinacridone dye. This final concentrate is then added at a 2% level to the base polypropylene used to make the extruded sheet, so that the final sheet contained 0.00072% or 7.2 ppm.

In the preferred embodiment, a multi-component blending system is used to precisely feed the different raw materials in to the hopper of an extruder. These raw materials typically consist of a neat polypropylene resin, a masterbatch containing the beta nucleant, a color concentrate containing carbon black or some other pigment, and "re-grind" from previous extrusion runs or edge trim that is taken off of the extruded sheet. As generally used herein, "re-grind" refers to portions of a previously extruded sheet that are ground up an added to the raw material feed used to make new sheet. If the neat polypropylene resin already contains a beta nucleating agent, a separate masterbatch containing the beta nucleant may not be needed. The extruder melts and homogenizes the different raw materials, and then pumps out the molten extrudate. A gear pump and a static mixer are often included in the extrusion system in order to provide for a consistent, homogeneous, and accurate flow of the polymer melt. At the end of the extruder is a sheet die which evenly distributes the polymer melt across the desired sheet width.

B. Quenching the Melt-Formed Sheet

In the preparation of the extruded sheet by the slit-die, T-die or other suitable process, the extruded sheet in the form of molten polymer is quenched, or cooled, to solidify the molten sheet by a suitable quenching means. The quenching means must be capable of quenching the sheet at a rate equal to or greater than the sheet production rate and the temperature encountered by the sheet in the quenching means must be in a range suitable to promote the development of beta-spherulites. The preferred temperature range of the sheet during solidification is 90° C. to 130° C. Suitable quenching means include a single quench roll and a multi-roll quench stack, such as a two-roll, a three-roll or a five-roll quench stack. The heated roll(s) cool the sheet uniformly and control the sheet thickness. An on-line thickness profiler is typically used to control the sheet thickness to tight tolerances.

Preferably, a three-roll vertical quench stack is used with the sheet nipped between the first and the second rolls with the beta-spherulite crystallinity starting at the second or middle roll and the sheet wrapping around the middle and third rolls. The temperature of the middle roll should be at least 80° C., preferably in the range of 90° C. to 130° C., for optimum production of beta-spherulites.

For a single layer sheet having beta-spherulites throughout the sheet, the temperature of the third roll should be in the range of about 80° C. to 110° C. However, if a single layer sheet with a very small amount of beta-spherulites near the sheet surfaces and a larger amount of beta-spherulites near the center is desired, the third roll temperature should be less than 80° C. The temperature of the first roll of the three-roll stack is less critical and can range from 50° C. to 150° C. without adversely affecting the beta-form content of the sheet.

The quenching means should be positioned relatively close to the extruder die, the distance between the quenching means and the extruder die is dependent on factors such as the temperature of the rolls, the sheet extrusion rate, the sheet thickness, and the roll speed. Typically the distance between the extruder die lips and the gap between the first and second heated rolls is less than 10 cm.

The finished sheet is wound onto a large roll for transfer to the next step in the process.

C. Extruding the Sheet

The extruded sheet may be one layer or multi-layered. A multi-layered sheet may contain, two layers, three layers or more than three layers. Conventionally, multi-layer and single layer sheets can be melt formed by coextrusion and extrusion, respectively, by various known shaping methods such as the calender method, the extrusion method and the casting method. The preferred method is melt extrusion slit-die or T-die process. Extruders used in such a melt-extrusion process can be single-screw or twin-screw extruders. Preferably, such machines are free of excessively large shearing stress and are capable of kneading and extruding at relatively low resin temperatures.

For producing a coextruded multi-layer sheet with one layer that contains a beta-nucleated resinous polymer, one extruder may be used to extrude a sheet of the beta-spherulite nucleated resin. A second extruder may be used to extrude a layer of non-nucleated polymer resin, which is located on at least one side of the nucleated resin. If a layer of non-nucleated resin is desired on both sides of the beta-nucleated resin, then a non-nucleated polymer melt can be split between two slit-dies and a second layer of extruded non-nucleated polymer sheet will be in contact with the other side of the beta-nucleated polymer resin layer between a second set of nip rolls.

Alternatively, more than one extruder can be used to supply molten polymer to a coextrusion die. This allows two or more distinct polymer layers to be coextruded from a given slit-die.

The temperature at the die exit should be controlled, such as through the use of a die-lip heater, to be the same as or slightly higher than the resin melt temperature. By controlling the temperature in this manner, "freeze-off" of the polymer at the die lip is prevented.

The die should be free of mars and scratches on the surface so that it produces a sheet with smooth surfaces.

D. Perforating the Sheet

After the extruded sheet solidifies, it passes through a sheet flattening unit, a perforator, and various orientation stations. The perforator produces a series of holes or depressions in the sheet. These holes or depressions may be circular, oval, square, or rectangular in shape. In general, the area of the holes or depressions is preferably less than 50% of the plain view area of the starting material, and more preferably less than 25%.

FIG. 1 illustrates the final steps in the process for manufacturing the plastic net. First, the sheet is un-rolled (5) and passed through a punch press (10), where a series of equally spaced holes are punched out (15). Different hole geometries and punch arrangements are possible, depending on the desired properties of the finished net product.

E. Orientation of the Sheet

After the sheet is perforated it is oriented in one or two directions. A sheet that is oriented in one direction (mono-axial or uni-axial oriented sheet) is typically used to reinforce earthen structures in civil engineering applications. A sheet that is oriented in two directions (biaxial oriented sheet) is typically used to reinforce road beds.

1. Machine Direction Orientation

If the sheet is to be oriented in only one direction, it passes through a machine direction (MD) orientation device, and is wound up on a winding unit. The draw ratios in the machine direction can vary from 2:1 to 10:1, and are preferably from 3:1 to 8:1. Hot air or heated rollers are used to heat the sheet to the appropriate stretching temperature.

2. Transverse Direction Orientation

If the sheet is to be stretched in two perpendicular directions (i.e. biaxially oriented), the sheet is stretched in the MD and the transverse direction (TD). The TD stretching step can occur before or after the MD orientation step. Typically, the sheet is not cooled down substantially between the first and second stretches. For the TD orientation step, the sheet passes through an oven that is heated using either forced air or radiant heaters. The TD orientation machine typically contains a series of clips attached to movable rails which hold the sides of the sheet. These rails diverge as the sheet passes through the TD machine, and this divergence causes the sheet to stretch in the transverse direction. A common name for the TD orientation machine is a Tenter Frame. The TD draw ratios can be in the range of 2:1 to 10:1, and are preferably in the range of 3:1 to 8:1. The overall area stretch ratio of a biaxially stretched sheet should be at least 13:1.

Figure 2:
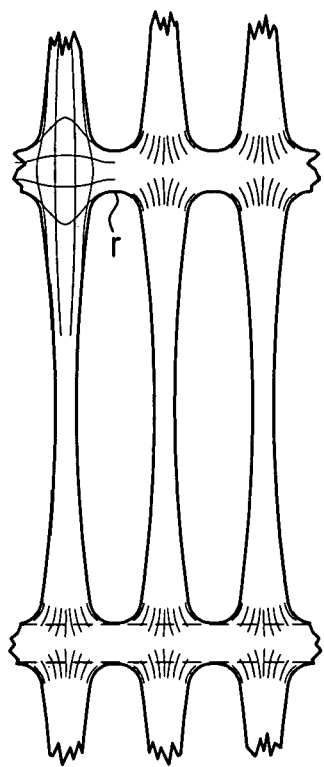
FIG. 2 illustrates the appearance of the machine-direction oriented sheet.

FIG. 1 illustrates the formation of a biaxally oriented sheet. In the first orientation step, the sheet is heated by passing over a series of heated rollers within a housing (20). The sheet is then heated up to the point where it can be stretched. The stretching is accomplished by rotating the last roller in the series at a higher speed, so that the polymer is drawn from the junctions into the ribs. The MD oriented sheet contains oblong holes (25). FIG. 2 shows an enlarged view of the MD oriented sheet. During this orientation step, the polymer molecules in the drawn regions are aligned in the machine direction, which imparts a great deal of strength and stiffness to the final net. When high levels of beta spherulites are present in the extruded sheet, the drawing characteristics of the sheet and the shape of the holes and ribs are different that the characteristics and shape found in sheets that do not contain beta spherulites. As shown in FIG. 2, the radius of curvature (r) of the drawn holes is smaller at the top and bottom of each hole, and the ribs have a more flared-out appearance where they join together at the top and bottom of each hole.

As illustrated in FIG. 1, in the second orientation step, the MD oriented sheet enters into a heated tenter frame (stenter) (30) where the sheet is stretched in the transverse direction, i.e. at right angles to the initial MD stretch. The stenter is heated with forced air, and there are two rails containing a series of clips, which grip the edge of the sheet as it passes into the stenter. These rails begin to diverge (35) after the sheet enters the stenter, causing the sheet to be stretched in the transverse direction.

The biaxially stretched net exits the stenter in the form of a net or grid (40). After the net exits the stenter it is wound onto a roll for shipment (45).

Figure 3:
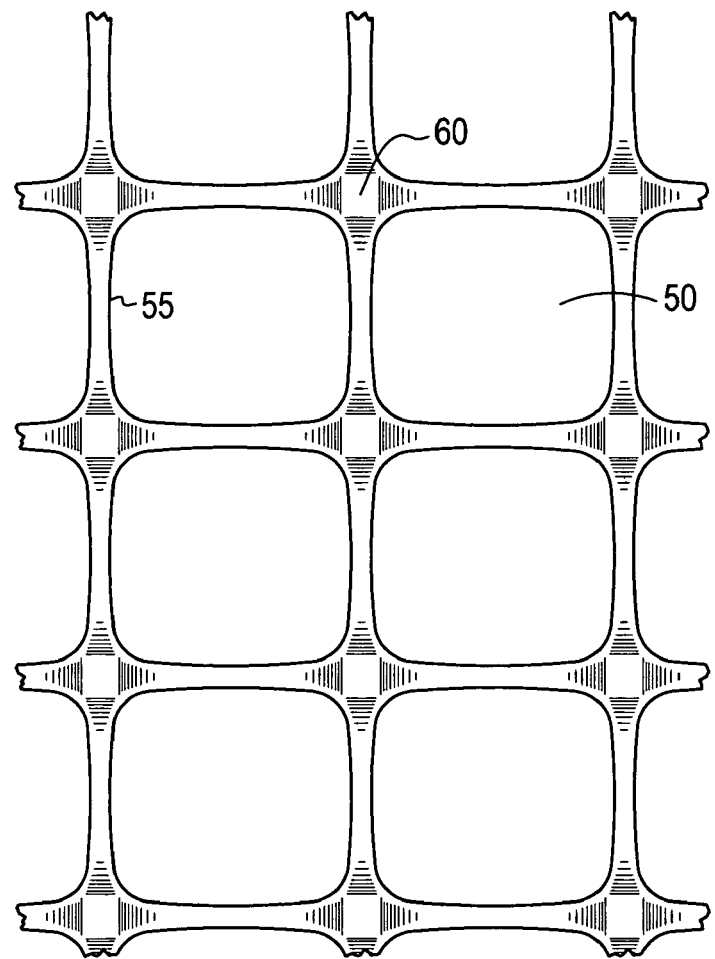
FIG. 3 illustrates the appearance of the biaxially oriented sheet.

FIG. 3 shows an enlarged view of the biaxially stretched net. The biaxial orientation of the net imparts a high degree of orientation and strength to all regions of the net. When high levels of beta spherulites are present in the extruded sheet the drawing characteristics of the sheet change, and the shape of the holes (50), the drawn strands (55), and the nodes (60) in the net are different. The most obvious differences are the reduced thickness of the node regions (60), which are normally much thicker than the drawn ribs and contain primarily un-drawn material. The width of the node junction region is also greater in the net made from the beta nucleated sheet, and this enhances certain properties of the final web.

3. Temperature

The stretching temperature during the orientation step(s) should be below 160° C., and is preferably below 155° C. A minimum stretching temperature of at least 80° C. is used, and preferably this minimum stretching temperature is at least 110° C. The temperatures used to stretch the sheet have a strong influence on its physical characteristics, including the degree of microvoiding which occurs during the stretching process. Since the beta-crystalline phase has a lower tensile yield stress than the alpha-crystalline phase, a sheet containing a high level of beta-spherulites can be stretched at lower temperatures without breaking or tearing, compared to that of a sheet containing only alpha-spherulites.

4. Rate

The beta-nucleated sheet can also be run at higher line speeds and stretched at higher drawing rates relative to that of a non-beta-nucleated sheet. These higher drawing rates also produce higher degrees of polymer orientation in the sheet, which leads to improved strength and stiffness properties in the final web product.

5. Properties of Resulting Net

When a sheet containing beta-spherulites is deformed in the solid state, i.e. at a temperature below the melting point of the beta-crystals, the beta crystals transform into alpha crystals without first melting and develop microvoids or pores. This microvoiding also causes a non-pigmented beta nucleated sheet to become white and opaque since the microvoids scatter light. The microvoiding also results in a final stretched sheet that has a lower density than that of a stretched sheet containing only alpha-crystals.

The degree of microvoiding depends on the concentration of beta-crystals, as measured by the K-value of the sheet or the size of the beta melting peak observed in a DSC scan, and the stretching temperature. The lower the stretch temperature, the higher the level of microvoiding, and the lower the density of the final oriented web. However, too low a stretching temperature is undesirable since such a low temperature can lead to breaking or tearing of the sheet.

For two sheets that contained the same starting thickness, after stretching, a sheet that contains a beta-nucleant and a high level of beta-spherulites has a higher level of rigidity and is stronger than a sheet that does not contain any beta-spherulites. Three factors contribute to this higher strength and stiffness. The first is the likelihood that the beta-to-alpha transformation of the beta-crystals during the stretching process will lead to a more crystalline and more uniformly oriented material. The second factor is the different drawing characteristics of the perforated beta nucleated sheet that is the precursor to the oriented polymer net or grid. In the case of the beta nucleated sheet, more polymeric material is drawn out of the node regions, which lie at the intersection of the machine direction and transverse direction oriented strands comprising the grid structure. This material becomes part of the strands that form this grid, making the strands thicker and wider than they would be in the absence of beta nucleation. The third factor is associated with the microvoiding and density reduction of the beta-nucleated sheet. Since the extruded sheets had the same starting thickness, the lower final density of the beta-nucleated net or grid demonstrates that this net or grid is thicker than a net or grid made from a sheet that is devoid of beta-spherulites.

Figure 4:
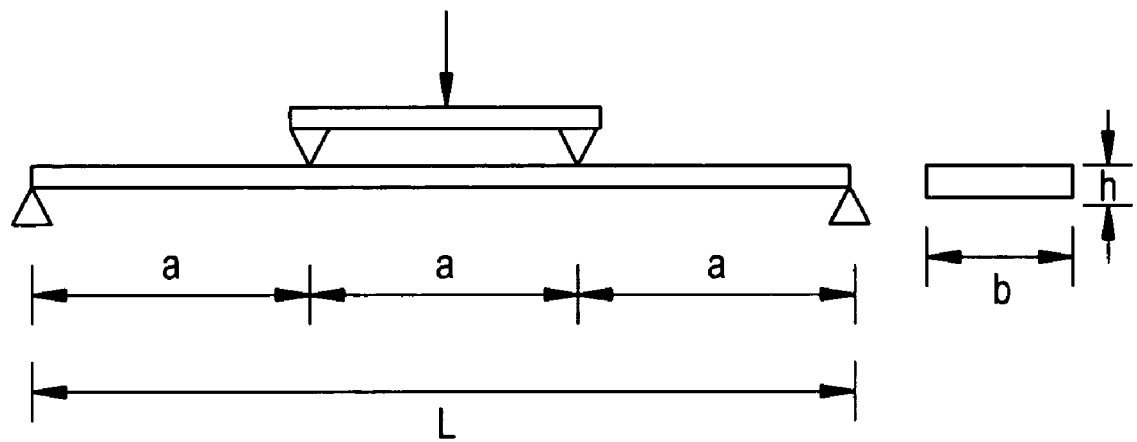
FIG. 4 illustrates a beam that is supported at each end and deflected in the middle.
Figure 5A:
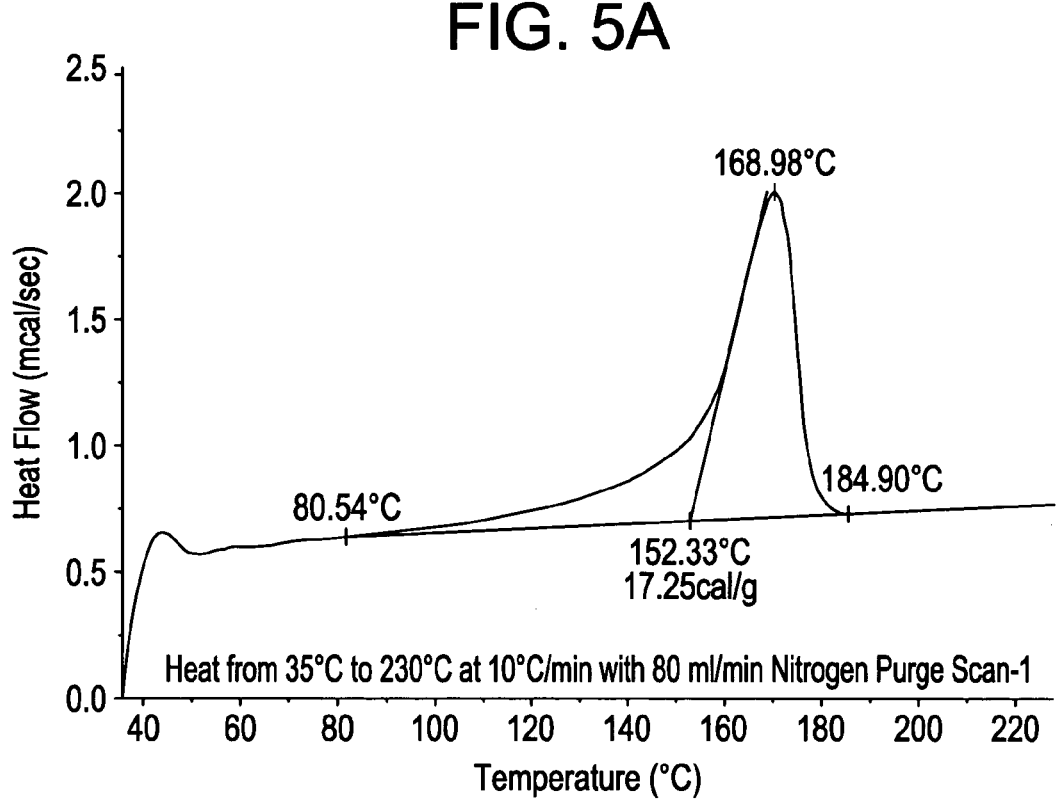
FIGS. 5A and 5B illustrate the differential scanning calorimeter (DSC) heating scans during the first and second heating cycles of the Sample 1 sheet.
Figure 5B:
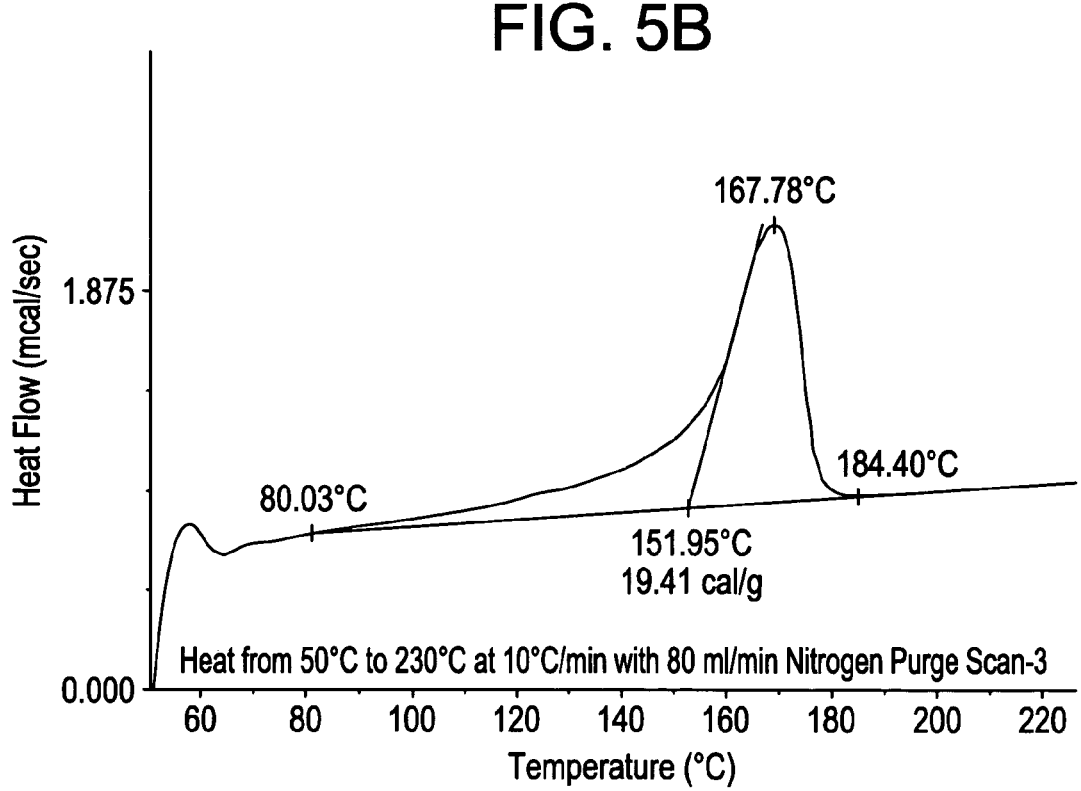
Figure 6A:
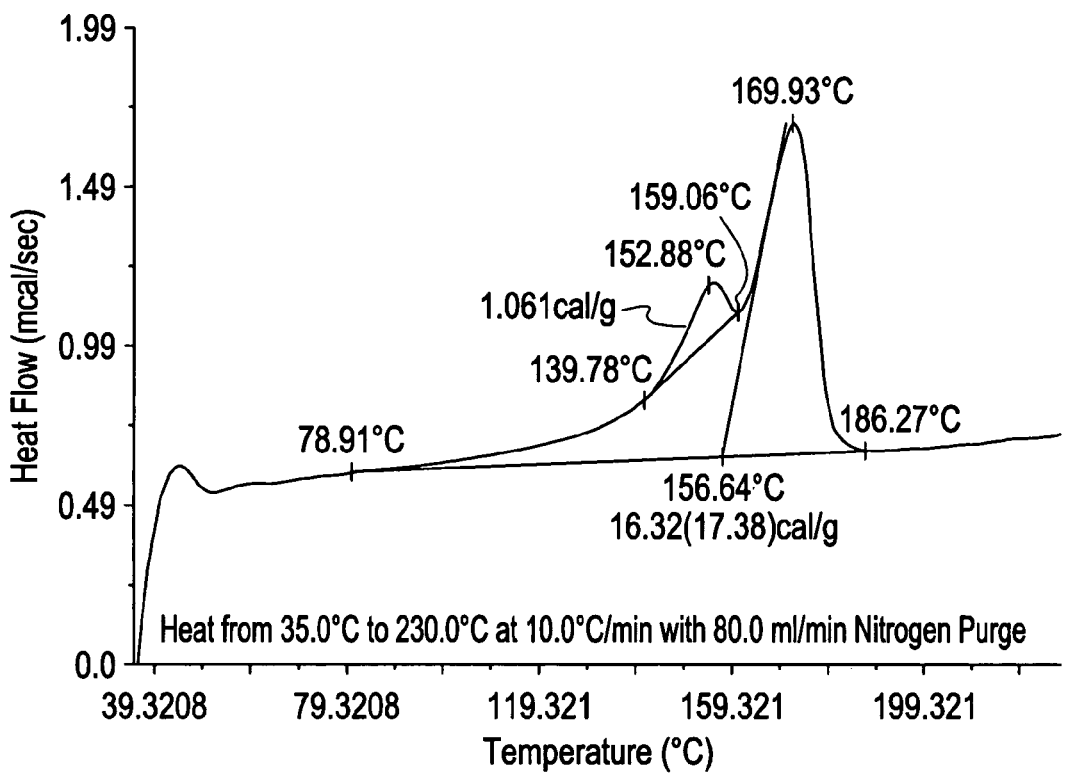
FIGS. 6A and 6B illustrate the DSC heating scans during the first and second heating cycles of the Sample 2 sheet.
Figure 6B:
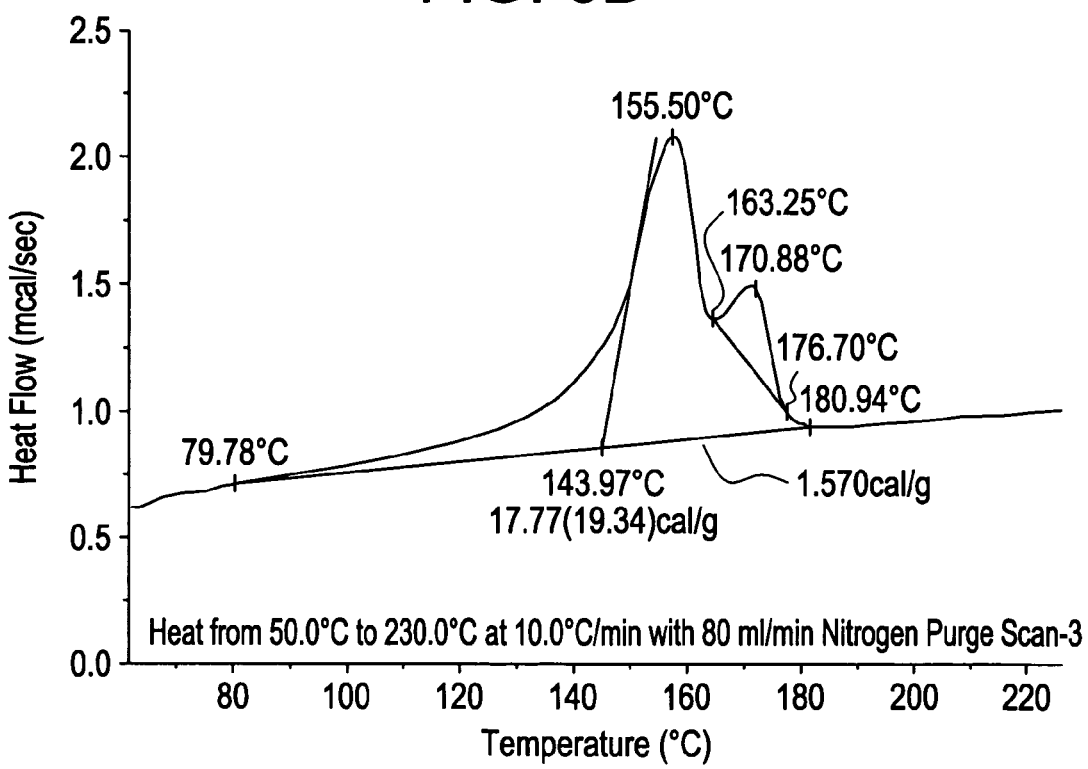
Figure 7A:
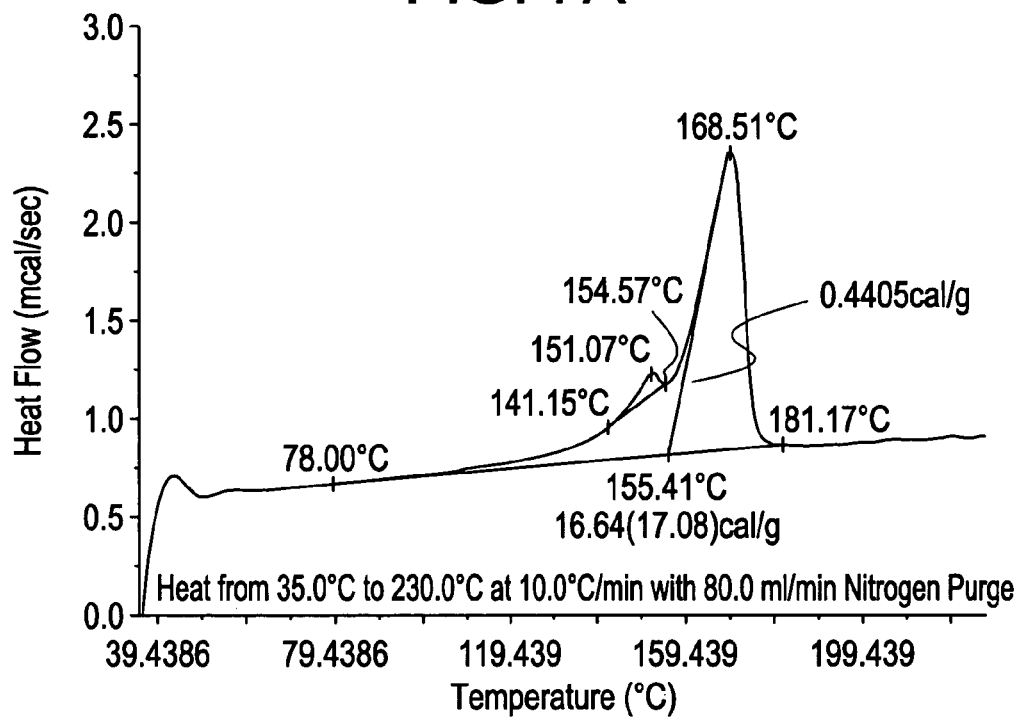
FIGS. 7A and 7B illustrate the DSC heating scans during the first and second heating cycles of the Sample 3 sheet.
Figure 7B:
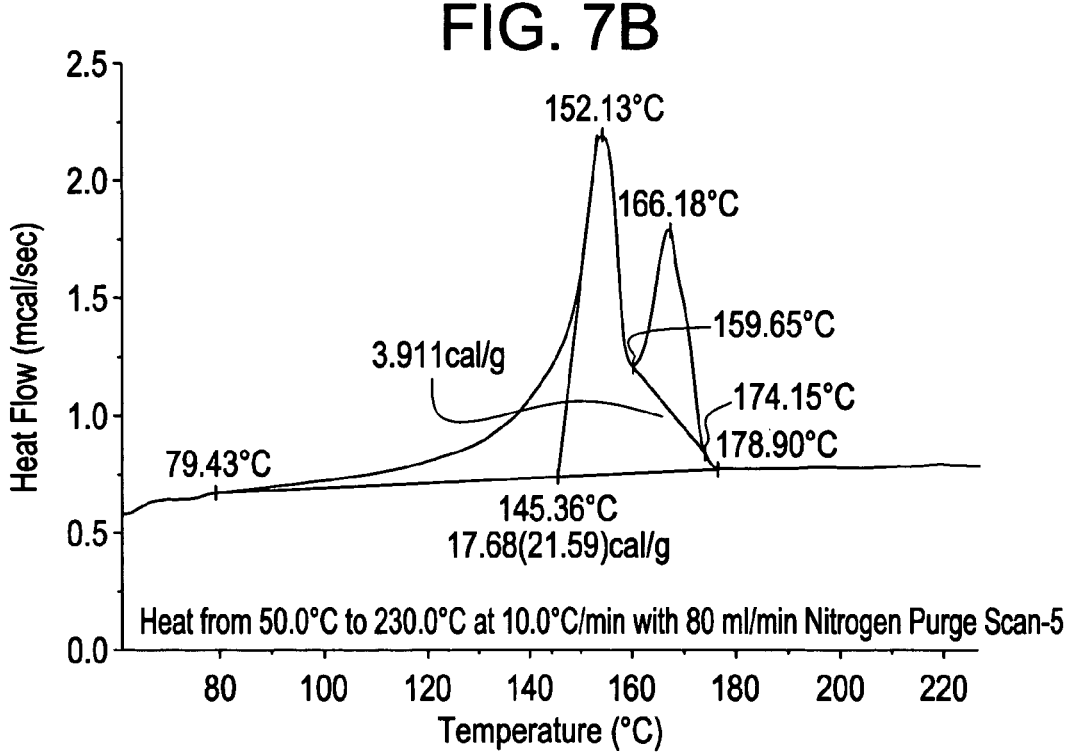

FIG. 4 and Equation I illustrate how to calculate the deflection of a beam that is supported at each end and deflected in the middle:

$$\text{deflection} = \frac{Pa}{48EI}(3L^2 - 4a^2) \qquad (I)$$

where:

P is the total load on the beam (delivered in equal amounts at two points);

a is the distance from one end of the beam to the nearest load, note that both loads must be applied at this distance, that is, the total load must be centered;

E is the Young's modulus; and

L is the supported length of the beam (center to center on the lower support cylinders).

For a rectangle, the moment of inertia (I) is calculated easily with Equation II:

$$I = \frac{bh^3}{12} \quad (II)$$

where b is the width of the rectangle; and h is the height of the rectangle.

The deflection of the beam under a given load varies inversely as the cube of the thickness of the beam. The rigidity of the beam, or the web made from the oriented extruded sheet, will vary inversely with the deflection, and therefore will be proportional to the cube of the thickness of the web. Although there will be some loss in the Young's modulus of the oriented web due to the presence of the microvoids, this decrease is less than the increase in the rigidity of the web caused by an increase in its thickness.

The beta-nucleated web can be formed so that it matches the strength and stiffness of the non-beta-nucleated web by reducing the thickness of the extruded beta-nucleated sheet. Thus, less raw material is needed to produce a beta spherulite containing polypropylene web with the same size (area), strength and stiffness as a web formed of polypropylene without beta spherulites, than the raw material needed to form the web of polypropylene without beta spherulites. The achievable weight reduction is at least 5% and more likely in excess of 10%, based on the weight of the non-nucleated sheet material. The preferred weight reduction is at least 15%, based on the weight of the non-nucleated sheet material.

III. Applications for Polypropylene Sheets

A. Different applications

The mesh sheet may be one layer or multi-layered. A multi-layered sheet may contain, two layers, three layers or more than three layers. Preferably, the mesh sheet is a one-layer geo-web. At least one of the layers contains beta spherulites so that either (1) the K parameter is in the range of about 0.2 to 0.95, and preferably in the range of 0.3 to 0.95, or (2) a prominent melting peak for the beta crystal phase is shown when a sample of the sheet is placed in a DSC and heated at a rate of 10° C. per minute, where the heat of fusion of the beta crystal phase is at least 5% of the heat of fusion of the alpha crystal phase. During the stretching process, the beta spherulites undergo microvoiding, causing the final mesh to have a lower density than a polypropylene mesh without beta spherulites. The high strength and modulus of the strands that form the mesh, and their reduced density, results in lighter weight-mesh structures which meet all of the physical property requirements for end-use applications, such as reinforcing grids to stabilize concrete and soil in civil engineering and landfill applications. The beta nucleated sheets can also be oriented at higher production rates leading to improved productivity and reduced manufacturing costs.

B. Properties of Extruded Polypropylene Mesh

The beta-spherulite content of the sheet can be defined qualitatively by optical microscopy, or quantitatively by x-ray diffraction or thermal analysis.

i. Optical Microscopy

In the optical microscopy method, a thin section microtomed from the sheet is examined in a polarizing microscope using crossed polars. The beta-spherulites show up as much brighter than the alpha spherulites, due to the higher birefringence of the beta-spherulites. For the extruded sheets, the beta-spherulites should occupy at least 20% of the field of view, and preferably at least 30% of the field of view.

ii. X-Ray Diffraction

In the x-ray diffraction method the diffraction pattern of the sheet is measured, and the heights of the three strongest alpha phase diffraction peaks, H110, H130 and H040 are determined, and compared to the height of the strong beta phase peak, H300. An empirical parameter known as "K" (herein referred to as the "K-value") is defined by the equation:

$$K = (H300)/[(H300)+(H110)+(H040)+(H130)]$$

The K-value can vary from 0, for a sample with no beta-crystals, to 1.0 for a sample with all beta-crystals.

In the preferred embodiment, the beta-spherulite nucleating agent is Q-dye, which is present in the composition in an amount ranging from 0.1 to about 50 ppm. The resulting sheet has a K-value in the range of about 0.2 to 0.95, preferably in the range of 0.3 to 0.85. This is also the suitable range of K-values when other beta nucleants are used.

iii. Thermal Analysis

Thermal analysis of the extruded sheet can be characterized by Differential Scanning Calorimetry (DSC) to determine the beta-spherulite nucleation effects. Parameters which are measured during the first and second heat scans of the DSC include the crystallization temperature, $T_c$, the melting temperature, $T_m$, of the alpha ($\alpha$) and beta ($\beta$) crystal forms, and the heat of fusion, $\Delta H_f$, including both the total heat of fusion, $\Delta H_{f\text{-}tot}$, and the beta melting peak heat of fusion, $\Delta H_{f\text{-}beta}$. The melting point of the beta-crystals is generally about 10-15° C. lower than that of the alpha crystals. The magnitude of the $\Delta H_{f\text{-}beta}$ parameter provides a measure of how much beta crystallinity is present in the sample at the start of the heat scan. Generally, the second heat of fusion values are reported, and these values represent the properties of the material after having been melted and recrystallized in the DSC at a cool-down rate of 10° C./minute. The first heat thermal scans provide information about the state of the material before the heat history of the processing step used to make the samples had been wiped out. The first heat thermal scan should show a distinct melting peak for the beta crystal phase, and the heat of fusion of the beta crystal phase should be at least 3% of the heat of fusion of the alpha crystal phase.

EXAMPLE

The example relates to the production of a beta nucleated concentrate and the use of this concentrate to produce an extruded sheet from which biaxially oriented net or grid products are made.

The beta nucleant was a red quinacridone dye, known as Hostaperm Red E3B, herein referred to as "Q-dye"(CAS No.: 16043-40-6). This dye was incorporated into a polypropylene homopolymer resin (PRO-FAX® 6523, produced by Basell Polyolefins) using extrusion compounding. The resin had a melt flow rate of 0.7 g/10 min. The concentration of the Q-dye was 0.047% (470 ppm). The final pellets of this polypropylene-Q-dye concentrate had a red color.

Extruded sheets were made on an 8-inch single screw extruder into which the different raw materials were fed using loss-in-weight feeders. The extruder had a typical output rate of 2300 lbs/hour, and the molten polymer passed through a static mixer and a gear pump before being extruded from a flat sheet die onto a three-roll cooling stack. The molten polymer bead was nipped between the bottom and middle rolls, and the sheet wrapped around the middle and top rolls while it cooled and solidified. The bottom roll temperature was set at 96.7° C., the temperature of the middle roll was set at 112.8° C., and the temperature of the top roll was set at 111.7° C. The zone temperature settings on the extruder ranged from 190° C. at the feed zone to 207° C. at the die. The melt temperature reading at the die was 238° C.

Example 1

Production of Five Different Extruded Sheet Samples and Their Properties.

Sample 1 was made using 100% of the PRO-FAX® 7823, which is a polypropylene homopolymer produced by Basell Polyolefins, with a melt flow rate of about 0.7 g/10 min. A beta nucleant or carbon black concentrate was not included in Sample 1. The line speed and roll gap nip were set to produce a final sheet thickness of 4.5 mm. The line speed was 3.25 meters/minute, and the final sheet width after the edges were trimmed off was 1.0 meter.

Sample 2 was made under the same processing conditions as Sample 1, except 2.68% of the Q-dye concentrate was introduced into the feed, resulting in a final sheet that contained about 12 ppm of the Q-dye. This sheet had a light pink color.

Sample 3 was made under the same processing conditions as Sample 1, except that 3% of a carbon black concentrate was introduced into the feed along with 2.68% of the Q-dye concentrate. This sheet had a uniform black appearance.

Sample 4 had the same resin composition as that of Sample 3, except that the line speed was increased to reduce the thickness of the final sheet to 4.15 mm.

Sample 5 had the same resin composition as that of Sample 4, except that the line speed was further increased to reduce the final sheet thickness to 3.84 mm.

Results

The compositions of the five different extruded sheet samples and the DSC thermal analysis data for Samples 1, 2, and 3 are listed in Table 1.

TABLE 1

| Sheet Composition Properties | | | | | |
|---|---|---|---|---|---|
| Property | Sample 1 | Sample 2 | Sample 3 | Sample 4 | Sample 5 |
| Q-dye ppm | 0 | 12 | 12 | 12 | 12 |
| Carbon Black (%) | 0 | 0 | 1 | 1 | 1 |
| Thickness (mm) | 4.5 | 4.5 | 4.5 | 4.15 | 3.84 |
| K-value 1st Heat | — | 0.83 | 0.69 | — | — |
| $T_m - \alpha$ (° C.) | 169.0 | 169.9 | 168.5 | — | — |
| $T_m - \beta$ (° C.) | — | 152.9 | 154.6 | — | — |
| $\Delta H_{f\text{-tot}}$ (cal/g) | 17.3 | 17.4 | 17.1 | — | — |
| $\Delta H_{f\text{-beta}}$ (cal/g) Cool Down | — | 1.06 | 0.44 | — | — |
| $T_c$ (° C.) 2nd Heat | 108.7 | 118.9 | 121.6 | — | — |
| $T_m - \alpha$ (° C.) | 167.8 | 170.9 | 166.2 | — | — |
| $T_m - \beta$ (° C.) | — | 155.5 | 152.1 | — | — |
| $\Delta H_{f\text{-tot}}$ (cal/g) | 19.4 | 19.3 | 21.6 | — | — |
| $\Delta H_{f\text{-beta}}$ (cal/g) | — | 17.8 | 17.7 | — | — |

The first and second DSC heating scans for Samples 1, 2 and 3 are depicted in FIGS. 5A and 5B, FIGS. 6A and 6B, and FIGS. 7A and 7B, respectively.

Discussion

These figures and the data in Table 1 indicate that Sample 1 sheet contains no evidence of beta crystals, and only a single melting peak for the alpha crystal phase is seen in both the first and second heat scans. The low $T_c$ value of 108.7° C. is also indicative of a non-nucleated material.

For the sheets of Samples 2 and 3, a distinct beta melting peak is seen in both the first and second heat scans. The K-values for these two sheet samples of 0.83 and 0.69 respectively also show that they contain a very high level of beta crystallinity. The magnitude of the $\Delta H_{f\text{-beta}}$ parameter is a measure of how much beta crystallinity is present in the sample at the start of the heat scan. Generally, the second heat $\Delta H$ values are reported, and these are representative of the properties of the material after having been melted in the DSC at a cool-down rate of 10° C. per minute. The first heat thermal scans provide information about the state of the material after it crystallized during the extrusion of the sheet. The very large values for the $\Delta H_{f\text{-beta}}$ parameters following the second heat scan showed that most of the material crystallized in the beta form following the cool-down in the DSC. This result demonstrates that the Q-dye was very effective as a beta nucleant in Samples 1 and 2. The elevated $T_c$ values for the sheets of Samples 1 and 2, also indicate that they were effectively nucleated by the Q-dye.

The sheets produced in Samples 1-5 were biaxially stretched using a line such as that illustrated in FIG. 1, in order to produce the final net or grid product. The MD and TD draw ratios were set at 3.1:1 and 4:1 respectively, and the initial air temperature settings were 132-135° C. These temperatures were somewhat below what was typically used to orient a carbon black containing sheet product. Prior to the orientation step, the sheet had circular holes punched in it, with a total of 105 holes, with a hole separation of 0.9 mm. Each edge of the sheet contained a strip with no holes punched in it, and the width of each solid edge was 28 mm.

Example 2

Comparison of the Properties of Final Net or Grid Materials Formed Using Samples 1 and 2.

The sheet sample from Sample 1 would not orient under these conditions and tore in the stenter oven. The temperatures were gradually raised until the sheet could be successfully oriented in both directions. It is believed that the sheet was not heating up sufficiently in the ovens due to the fact that it did not contain any carbon black. The final set temperature of the rolls during the MD portion of the orientation was 153° C., which is about 7° C. higher than that which is typically used for orienting carbon black containing sheets.

The sheet sample of Sample 2 was also biaxially oriented under the same conditions as that used to orient the sheet of Sample 1. When the sheet sample of Sample 2 exited the MD orientation it had a distinctly different appearance from the sheet sample of Sample 1 with respect to both the shape of the holes and the color of the oriented MD strands. The elongated holes in the Sample 1 sheet had a rounded appearance at their top and bottom apex points (where they touched the node regions), while the holes from the Sample 2 sheet had a much smaller radius of curvature at these apex points. The MD strands in the Sample 2 sheet were white/opaque in appearance, while the strands from the Sample 1 sheet had a translucent appearance. The white/opaque appearance of the Sample 2 strands is due to the microvoiding that occurred when the beta spherulites in the sheet were stretched. The elongated holes in the Sample 2 sheet were also more closely spaced than those in the Sample 1 sheet after the MD stretching, and the overall width of the Sample 2 sheet was only about 94 cm, compared to a width of 100 cm for the stretched Sample 1 sheet.

Figure 8:
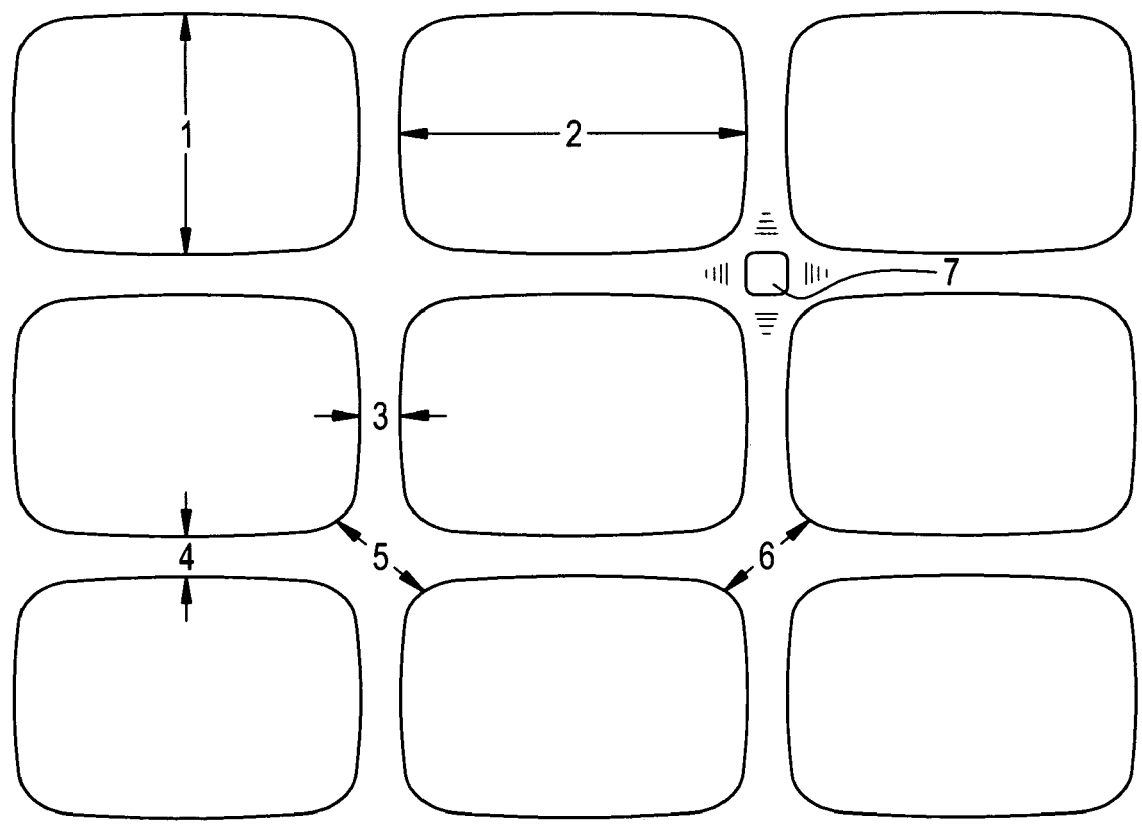
FIG. 8 illustrates the appearance of the biaxially oriented net formed by the extruded sheets.

After both sheets were biaxially stretched, there were significant differences in the final hole and web dimensions. The appearance of the final grids made from the Samples 1 and 2 sheets is illustrated in FIG. 8. The various dimensions are tabulated in Table 2.

TABLE 2

Sheet Dimensions For Non-pigmented Grid Products

| # | Q-dye (ppm) | Mesh MD length1 (mm) | Mesh TD length2 (mm) | Mesh Area (mm²) | MD Strand width3 (mm) | MD strand3 thickness (mm) | TD Strand width4 (mm) | TD strand4 thickness (mm) | MD strand cross-section area (mm²) | TD strand cross-section area (mm²) | Node width5 (mm) | Node width6 (mm) | Node thickness7 (mm) |
|---|---|---|---|---|---|---|---|---|---|---|---|---|---|
| 1 | 0 | 27.76 | 34.81 | 966 | 3.23 | 1.79 | 3.27 | 1.15 | 5.78 | 3.76 | 10.6 | 9.3 | 3.81 |
| 2 | 12 | 22.96 | 36.17 | 831 | 3.43 | 1.92 | 3.63 | 1.14 | 6.59 | 4.14 | 11.2 | 11.7 | 1.80 |

The density value obtained on the strands in Sample 2 sheet was 0.871 g/cm3, while the density of the strands in Sample 1 sheet was 0.907 g/cm³. This represents a density reduction of about 4% for the oriented strands of the beta nucleated Sample 2.

The grid made from the Sample 2 sheet had a smaller open mesh area, a wider node region, strands with higher cross sectional areas, and thinner node regions than the grid made from Sample 1. Both biaxially oriented grids contain the same number of mesh openings per unit area of sheet, since they both contained the same arrangement of punched-out holes. Sample 2 grid will require higher forces to break when placed under tension. Likewise, the greater area of the junction regions in the Sample 2 grid indicates that the node regions have greater torsional rigidity and are better able to resist the forces present when the grid is used to reinforce roadbeds or other earthen structures than a net structure that does not contain beta-spherulites.

Example 2

Comparison of the Properties of Final Net or Grid Materials Formed Using Samples 3, 4, 5, and 6.

The carbon black containing sheet formed using Samples 3, 4, and 5 were biaxially stretched after having the same pattern of holes punched into them as was punched into Samples 1 and 2. Prior to stretching the Sample 3 sheet, a standard carbon black containing sheet ("Sample 6") with a thickness of 4.5 mm with no Q-dye was stretched. The MD roll temperatures were set at 150° C. for stretching all of these sheet samples. The final biaxial grid made from Sample 6 had distinct raised humps at the node junction points, whereas the biaxial grids made from the other beta nucleated sheet samples only had a minor thickening in the node region. The sheet dimensions of these different products are listed in Table 3.

TABLE 3

Sheet Dimensions for Black Grid Products

| # | Q-dye (ppm) | Mesh MD length1 (mm) | Mesh TD length2 (mm) | Mesh Area (mm²) | MD Strand width3 (mm) | MD strand3 thickness (mm) | TD Strand width4 (mm) | TD strand4 thickness (mm) | MD strand cross-section area (mm²) | TD strand cross-section area (mm²) | Node width5 (mm) | Node width6 (mm) | Node thickness7 (mm) |
|---|---|---|---|---|---|---|---|---|---|---|---|---|---|
| 6 | 0 | 26.5 | 36.3 | 961 | 3.22 | 1.70 | 3.12 | 1.11 | 5.47 | 3.46 | 9.3 | 10.5 | 3.41 |
| 3 | 12 | 25.3 | 34.3 | 868 | 3.60 | 1.87 | 3.77 | 1.22 | 6.73 | 4.60 | 11.6 | 11.7 | 2.29 |
| 4 | 12 | 25.9 | 34.7 | 899 | 3.68 | 1.62 | 3.73 | 1.04 | 5.96 | 3.88 | 12.2 | 11.6 | 1.95 |
| 5 | 12 | 26.3 | 35.1 | 923 | 3.62 | 1.44 | 4.18 | 0.80 | 5.21 | 3.34 | 13.0 | 12.5 | 1.84 |

Therefore, the smaller mesh area of Sample 2 means that a greater percentage of the total mesh contains solid, oriented polymer. This difference reflects the fact that more material was drawn out of the node region in the sheet from Sample 2, and this extra polymer increases the percentage of the mesh structure that contains solid polymer. Since the strands from the mesh made from Sample 2 sheet have a greater cross-sectional area than the strands from the Sample 1 mesh, the The density of the strands in the MD oriented web produced from the Sample 3 and Sample 6 sheets were 0.876 g/cm³ and 0.911 g/cm³, respectively. This results in a density reduction of almost 4% for Sample 3, due to the development of microvoids in the beta nucleated product.

Samples 3 and 6 both had the same starting sheet thickness of 4.5 mm, and the presence of beta spherulites in Sample 3 had an effect on the sheet dimensions that was similar to the effect on the dimension of the Sample 2 sheet (see Table 2).

Thus, the Sample 3 sheet had a smaller mesh area, larger strand cross sectional area, a wider node region, and a thinner node hump than the Sample 6 sheet. As the starting sheet thickness decreased for the beta nucleated sheet samples (Samples 3, 4, and 5), the open mesh area increased and the thickness of the strand and node regions decreased. However, the node region width continued to be much broader than that of Sample 6, and the open mesh area also remained lower than that of Sample 6.

The grid products formed using Samples 3, 4, 5, and 6 were evaluated using the following tests:

2% and 5% MD Tensile Strength: The true resistance to elongation when a mesh is cut from the grid and tested parallel to the machine direction and subjected to a load measured via ASTM D6637, with the load being measured after the sample has been deformed by 2% elongation.

2% and 5% TD Tensile Strength: The true resistance to elongation when a mesh is cut from the grid and tested perpendicular to the machine direction and subjected to a load measured via ASTM D6637, with the load being measured after the sample has been deformed by 2% elongation.

MD and TD Ultimate Tensile Strength: The maximum load that the mesh sample is subjected to before breaking or yielding occurs in either the machine direction (MD) or perpendicular to the machine direction (TD) when the sample is measured using ASTM D6637.

Mass: The weight per unit area of the final biaxially oriented grid product.

Torsional Aperture Stability: The resistance to in-plane rotational movement measured by applying a 20 kg-cm moment to the central junction of a 9 inch by 9 inch specimen restrained at its perimeter (U.S. Army Corps of Engineers Methodology for measurement of Torsional Rigidity).

Table 4 lists the physical properties of the biaxial grid products made from Samples 3, 4, 5, and 6.

Another advantage that was observed during the production of these grid products was that the beta nucleated sheet samples could be run at higher line speeds. A typical production rate for the grid product of Sample 6 through the biaxial orienting equipment is 13 m/minute. If higher line speeds are desired, the oven temperatures must be raised so that the sheet will pick up a sufficient amount of heat to raise its temperature to the minimum temperature at which it can be oriented without tearing. There is a limit, however, as to how high this temperature can be raised. If the sheet temperature becomes too high, the sheet will begin to melt and sag in the stenter oven; and it will also be more difficult to grip the sheet without having it pull out of the grips. A practical upper limit for line speeds on the equipment that was used in these tests was 15 m/minute. During the production of the biaxially oriented grid of Sample 5, the line speed was increased to 20 m/min, without experiencing any tears in the sheet. Two reasons may explain why a higher line speed could be achieved with Sample 5. The ability to use faster line speeds for sheets containing high levels of beta spherulites offers an additional economic advantage for the use of this beta nucleation technology.

It is understood that the disclosed invention is not limited to the particular methodology, protocols, and reagents described as these may vary. It is also to be understood that the terminology used herein is for the purpose of describing particular embodiments only, and is not intended to limit the scope of the present invention which will be limited only by the appended claims.

We claim:

1. An oriented web produced from a perforated extruded sheet comprising a propylene polymer comprising beta-spherulites in an amount sufficient to produce a K-value of about 0.2 to 0.95 when measured by x-ray diffraction or to show a beta crystalline melting peak during the first or second heating scan when measured using a differential scanning calorimeter, wherein the oriented web is biaxially oriented and wherein the web has thickness in the node junction region between the machine direction and transverse direction strands that is at least 10% less than that of an otherwise identical biaxially oriented web made from a perforated, extruded propylene sheet with no added beta nucleant and the same starting sheet thickness and wherein the oriented web has a tensile strength measured at 2% elongation in the machine direction, that is at least 10% higher than that of an otherwise identical biaxially oriented web made from a perforated, extruded propylene sheet with no added beta nucleant and the same starting thickness.

2. The oriented web of claim 1, wherein the extruded sheet can be run at line speeds that are at least 5% faster than the line

TABLE 4

Physical Properties of Biaxially Oriented Black Grids

| Sample | Q-dye (ppm) | Extruded Sheet Thickness (mm) | 2% MD Tensile (kN/m) | 2% TD Tensile (kN/m) | 5% MD Tensile (kN/m) | 5% TD Tensile (kN/m) | MD Ult. Tensile (kN/m) | TD Ult. Tensile (kN/m) | Mass (kg/m2) | Torsional (cm-kg/deg) |
|---|---|---|---|---|---|---|---|---|---|---|
| 6 | 0 | 4.5 | 6.0 | 9.0 | 11.8 | 19.6 | 19.2 | 28.8 | 0.313 | 6.5 |
| 3 | 12 | 4.5 | 7.9 | 13.0 | 13.2 | 23.3 | 24.3 | 36.4 | 0.309 | 8.7 |
| 4 | 12 | 4.15 | 7.6 | 11.5 | 12.6 | 21.4 | 23.9 | 32.2 | 0.268 | 9.1 |
| 5 | 12 | 3.84 | 7.6 | 11.6 | 12.8 | 21.3 | 23.4 | 31.0 | 0.254 | 8.0 |

It can be seen from the data listed in Table 4 that the beta nucleated sheets of Samples 3, 4 and 5 all had tensile strength and torsional rigidity values that exceeded that of the non-nucleated control sheet of Sample 6. This strength and rigidity improvement was even seen for the sheets of Samples 4 and 5, where the initial extruded sheet thickness was lower than that of Sample 6, and the weight of the final grid products made from Samples 4 and 5 was also less than that of the Sample 6 grid.

Thus by extruding a sheet containing high levels of beta crystallinity, one can meet the physical property requirements of a non-nucleated grid product with a thinner starting sheet that requires less raw material to make. This results in a significant reduction in the cost required to make the net or grid product.

speeds for an otherwise identical perforated, extruded propylene sheet with no added beta nucleant and the same starting thickness.

3. The oriented web of claim 1, wherein the oriented web has a tensile strength measured at 5% elongation in the machine direction, that is at least 10% higher than that of an otherwise identical biaxially oriented web made from a perforated, extruded propylene sheet with no added beta nucleant and the same starting thickness.

4. The oriented web of claim 1, wherein the oriented web has a torsional rigidity that is at least 10% higher than that of an otherwise identical biaxially oriented web made from a perforated, extruded propylene sheet with no added beta nucleant and the same starting thickness.

5. The oriented web of claim 1, wherein the beta-spherulites are produced by addition of a beta-nucleating agent having the structural formula:

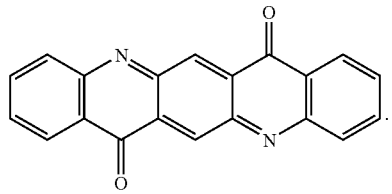

6. The oriented web of claim 1, wherein the propylene polymer is selected from polypropylene homopolymer and copolymers of polypropylene containing other alpha-olefin monomers.

7. An oriented web produced from a perforated extruded sheet comprising a propylene polymer comprising beta-spherulites in an amount sufficient to produce a K-value of about 0.2 to 0.95 when measured by x-ray diffraction or to show a beta crystalline melting peak during the first or second heating scan when measured using a differential scanning calorimeter, wherein the oriented web is uniaxially oriented and wherein the web has thickness in the node junction region between the machine direction and transverse direction strands that is at least 10% less than that of an otherwise identical uniaxially oriented web made from a perforated, extruded propylene sheet with no added beta nucleant and the same starting sheet thickness and wherein the oriented web has a tensile strength measured at 2% elongation in the machine direction, that is at least 10% higher than that of an otherwise identical uniaxially oriented web made from a perforated, extruded propylene sheet with no added beta nucleant and the same starting thickness.

8. The oriented web of claim 7, wherein the extruded sheet can be run at line speeds that are at least 5% faster than the line speeds for an otherwise identical perforated, extruded propylene sheet with no added beta nucleant and the same starting thickness.

9. The oriented web of claim 7, wherein the oriented web has a tensile strength measured at 5% elongation in the machine direction, that is at least 10% higher than that of an otherwise identical uniaxially oriented web made from a perforated, extruded propylene sheet with no added beta nucleant and the same starting thickness.

10. The oriented web of claim 7, wherein the oriented web has a torsional rigidity that is at least 10% higher than that of an otherwise identical uniaxially oriented web made from a perforated, extruded propylene sheet with no added beta nucleant and the same starting thickness.

11. The oriented web of claim 7, wherein the beta-spherulites are produced by addition of a beta-nucleating agent having the structural formula:

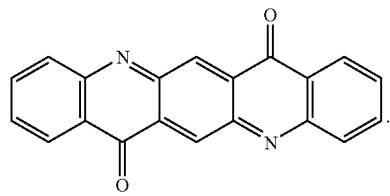

12. The oriented web of claim 7, wherein the propylene polymer is selected from polypropylene homopolymer and copolymers of polypropylene containing other alpha-olefin monomers.

13. A method for making a perforated oriented web, wherein the oriented web is uniaxially oriented or biaxially oriented and wherein the web has thickness in the node junction region between the machine direction and transverse direction strands that is at least 10% less than that of an otherwise identical uniaxially oriented or biaxially oriented web made from a perforated, extruded propylene sheet with no added beta nucleant and the same starting sheet thickness and wherein the oriented web has a tensile strength measured at 2% elongation in the machine direction, that is at least 10% higher than that of an otherwise identical biaxially oriented web made from a perforated, extruded propylene sheet with no added beta nucleant and the same starting thickness, the method comprising the steps of:

(a) feeding a concentrate and a resinous propylene polymer to an extruder to melt from a polymeric sheet, wherein the concentrate comprises a propylene resin and a beta-nucleating agent, wherein the beta-nucleating agent is present in a concentration in a range of 1.2% to 0.036% by weight of the total polymer content, (b) quenching the polymeric sheet at a quench temperature sufficient to produce a propylene sheet comprising beta-spherulites in an amount sufficient to produce a K-value of about 0.2 to 0.95 when measured by x-ray diffraction or to show a beta crystalline melting peak during the first or second heating scan when measured using a differential scanning calorimeter, (c) extruding the quenched sheet, (d) perforating the extruded sheet, and (e) orienting the perforated sheet uniaxially or biaxially, wherein the orienting step comprises heating the perforated sheet to a temperature less than or equal to 155° C.

14. The method of claim 13, wherein step (a) further comprises feeding to the extruder an additive selected from the group consisting of lubricants, antioxidants, ultraviolet absorbers, radiation resistant agents, antiblocking agents, antistatic agents, coloring agents, and opacifiers, which do not nucleate the alpha crystal form of polypropylene.

15. The method of claim 13, wherein step (e) comprises stretching the perforated sheet at a higher drawing rate relative to a drawing rate used to stretch an otherwise identical perforated, extruded propylene sheet with no added beta nucleant and the same starting thickness.

16. The method of claim 13, wherein the beta-nucleating agent has the structural formula:

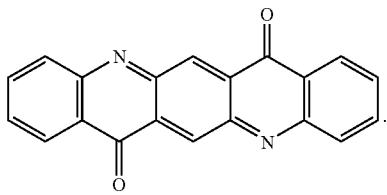

17. The method of claim 13, wherein the propylene polymer is selected from polypropylene homopolymer and copolymers of polypropylene containing other alpha-olefin monomers.

18. The method of claim 13, wherein the extruded sheet is run at line speeds that are at least 5% faster than the line speeds for an otherwise identical perforated. extruded propylene sheet with no added beta nucleant and the same starting thickness.

* * * * *